United States Patent Office 3,333,368
Patented Aug. 1, 1967

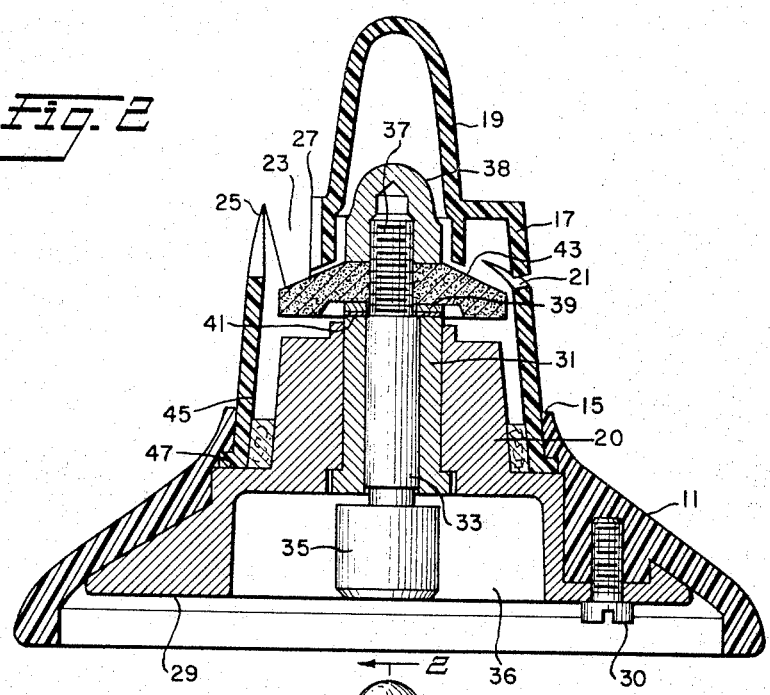
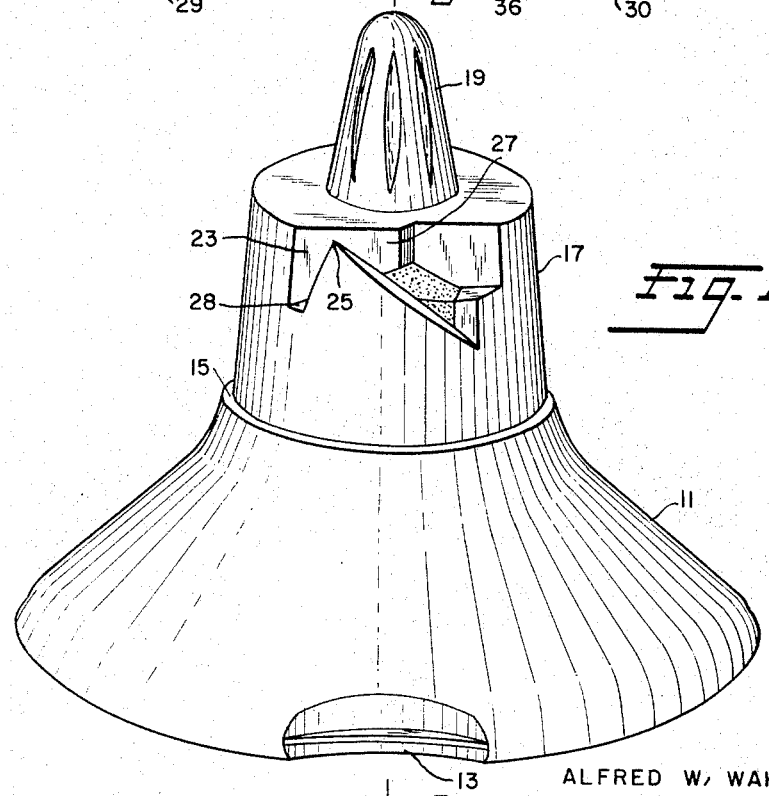

3,333,368
KNIFE SHARPENER
Alfred W. Wakeman, Durham, Conn., assignor to Dynamics Corporation of America, New York, N.Y., a corporation of New York
Filed Dec. 24, 1964, Ser. No. 420,933
4 Claims. (Cl. 51—241)

ABSTRACT OF THE DISCLOSURE

An attachment for a blending device for sharpening knives and scissors which includes a rotatable beveled grinding stone capable of being coupled to the blending device. The stone is covered by a rotatable housing having a single angular slot adjacent the stone for sharpening knives and a vertical slot on the opposite side of the housing for sharpening scissors. A knurled knob is provided at the top of the housing for manual rotation thereof.

---

This invention relates generally to a combined knife and scissor sharpener and more specifically to such a sharpener for attachment to a blender or the like driving unit.

Many types of motor driven knife sharpeners are on the market today. Generally speaking, these devices contain their own motor and are, therefore, constructed as an independent unit. Since a large number of households now have a blending device as standard equipment, it becomes desirable from an economic standpoint to be able to use the motor of the blender device for various operations.

A number of such knife sharpeners have been designed and manufactured in the past, but one of the primary problems encountered was that the final device was relatively expensive and lacked the advantage that an attachment has over an independently driven sharpener. Most of the devices operating as attachments have complicated gearing in the belief that it is necessary to drastically reduce the speed of the driving stone below that of the normal motor speed of a blender unit.

The present device does not use any gear ratio reduction since it has been found that with the proper construction of the guide for the knife and the scissors, the grinding stone may be rotated at a speed which is the same as a normal blender motor speed.

An object of this invention is to provide an inexpensive attachment for a blender which is capable of using the blender motor to rotate a grinding stone for sharpening both knives and scissors.

Another object of this invention is to provide a knife sharpener attachment wherein the knife may be sharpened using but a single guide slot rather than the standard two slot arrangement. This gives the added advantage of simplifying the configuration of the grinding stone.

A further object of this invention is to provide a knife sharpener attachment having a housing which itself is relatively rotatable with the grinding stone so that the guide slots in the housing may be positioned in the most convenient and desirable manner.

These and other objects will become apparent from the following description when taken in conjunction with the drawings wherein:

FIG. 1 is a perspective view of the knife sharpener attachment of the present invention; and FIG. 2 is a cross-sectional view taken along the lines 2—2 of FIG. 1.

Turning now more specifically to the drawings, there is shown a base housing member 11 having a substantially frusto-conical shape. Circumferential indentations 13 may be molded into housing member 11 in order to match with the standard upstanding fingers of the modern day blenders which maintain the blender bowl in position and keep it from rotating. These indentations serve the same purpose with respect to the knife sharpener attachment and, of course, may be designed so as to fit the particular blender with which the attachment is to be used.

An upper housing generally indicated at 17 in FIG. 1 extends downwardly within the upper circular opening 15 of the base housing member 11. This upper housing 17 is rotatable within the base housing member 11 for purposes which will become apparent as the description proceeds. In order to provide a means for manual rotation of the upper housing 17, an integral knurled knob 19 extends upwardly therefrom so as to provide a manual gripping member.

A metal bearing housing 20 fits within the base housing member 11 and may be formed so as to provide a base extension 29 extending circularly about and within the base housing member. The bearing housing 20 may be secured to the base housing 11 by means such as screws 30. It will be noted that the upper housing 17 rests on a shoulder of the bearing housing and is supported thereby.

Bearing member 31, which may be press-fit within the bearing housing 20 provides the necessary structural support for rotating shaft 33 which is in turn connected to driving means 35. Driving means 35 may be a socket head drive screw adapted to meet with the driving shaft of the blender itself.

The upper end of shaft 33 is externally threaded and the grinding stone 43 passes thereabout and is held firmly in place by means of cap screw 38. A metal washer 39 and a fiber washer 41 may be placed between the stone and the bearing member.

At one side of the upper housing 17 there is provided an angular guide slot 21 which is adjacent and slightly above the outer upper edge of the grinding stone 43. This slot is cut into the casing at the standard accepted angle for sharpening knives, which is a slight angle to the horizontal. In the opposite side of the upper housing, there is provided a vertical guide slot 23 which terminates at the inside in a substantially flat face 27 and on the outside with an upwardly extending wall portion 25. The base 28 of the slot 23 is adjacent to and slightly above the outer edge of the grinding stone 43.

When the device is put into operation, it is merely placed on top of the blender base so that the socket 35 may mate with the blender drive shaft. The knurled knob 19 is grasped in one hand so as to maintain the attachment on the blender base. When the motor is turned on, the upper housing is held in the position as shown in FIG. 2 and the knife is inserted into the guide slot 21. As the knife is drawn through the guide slot in a normal manner, one side of the knife edge will be ground. In order to grind the other edge of the knife, the upper housing is merely rotated substantially 180 degrees and the knife is again turned about and inserted in the slot with the resulting sharpening of the knife. As will be obvious, the grind stone may be very simple in configuration having only one bevelled surface since that surface provides the grinding of both sides of the knife blade and neither a second slot nor a second bevelled surface is required.

When scissors are to be sharpened, it is unnecessary to rotate the upper housing 17 after it is once placed in the most convenient position. This is true since the blades of the scissors must be turned around in order to grind the opposing blades. However, the rotatable housing still allows adjustability for the particular individual using the sharpener.

It will now be obvious that an extremely simple and economical knife sharpener is provided by means of this invention which may be used as an attachment for a separate motor driven device, such as a blender. It will be understood that the drawings and specification are illustrative only and certain modifications will be well within the scope of the present invention.

I claim:
1. A knife sharpener attachment for a blender comprising,
   a bearing housing having a borehole extending substantially vertically therethrough,
   a shaft extending through said bearing housing and terminating in a female socket member at one end within said bearing housing,
   a grinding wheel on said shaft above said bearing housing,
   means for securing said wheel to said shaft so that it is rotatable therewith,
   a base housing member surrounding said bearing housing,
   an upper housing surrounding said wheel and rotatably mounted within said base housing member,
   an angular slot adjacent to said wheel in one side of said upper housing, the plane of said slot passing through the axis of said shaft, and
   a vertical slot in said upper housing on the side opposite to said angular slot, said vertical slot being substantially parallel to the axis of said shaft and terminating at said wheel.

2. The attachment of claim 1 further comprising a knurled knob on said upper housing for manual rotation thereof.

3. A knife sharpener attachment for a blender comprising,
   a bearing housing,
   a rotatable shaft extending upwardly through said housing,
   a grinding wheel secured to said shaft above said housing,
   a base housing member surrounding said bearing housing and secured thereto,
   an upper housing rotatably mounted within said base housing member and extending outwardly therefrom,
   an angular guide slot in the side of said upper housing adjacent to the upper outer edge of said grinding wheel, and
   a vertical guide slot in said upper housing on the side opposite to said angular slot and terminating adjacent to the upper side of said grinding wheel.

4. The attachment of claim 3 further comprising a knob extending above said upper housing for manual rotation thereof.

References Cited
UNITED STATES PATENTS

| | | | |
|---|---|---|---|
| 2,077,195 | 4/1937 | Adams | 51—128 |
| 2,722,783 | 11/1955 | O'Russa | 51—102 |
| 2,790,282 | 4/1957 | Canas | 51—241 |
| 2,948,091 | 8/1960 | MacFarland | 51—241 |
| 2,949,709 | 8/1960 | De Angelis et al. | 51—128 |

LESTER M. SWINGLE, *Primary Examiner.*